(12) United States Patent
Gordon et al.

(10) Patent No.: US 10,717,239 B2
(45) Date of Patent: Jul. 21, 2020

(54) FABRICATION OF GAP FILLERS FOR COMPOSITE PARTS THAT EXHIBIT VARYING RADII OF CURVATURE

(71) Applicant: The Boeing Company, Chicago, IL (US)

(72) Inventors: Christian Gordon, Kingsville (AU); Andrew Klimovski, Melbourne (AU)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 15/718,704

(22) Filed: Sep. 28, 2017

(65) Prior Publication Data

US 2019/0091945 A1   Mar. 28, 2019

(51) Int. Cl.
| | | |
|---|---|---|
| *B29C 70/52* | (2006.01) | |
| *B29C 70/20* | (2006.01) | |
| *B29C 70/56* | (2006.01) | |
| *B29L 31/30* | (2006.01) | |
| *B29K 307/04* | (2006.01) | |

(52) U.S. Cl.
CPC .......... *B29C 70/205* (2013.01); *B29C 70/52* (2013.01); *B29C 70/523* (2013.01); *B29C 70/525* (2013.01); *B29C 70/527* (2013.01); *B29C 70/56* (2013.01); *B29K 2307/04* (2013.01); *B29L 2031/3076* (2013.01)

(58) Field of Classification Search
CPC .................................................... B29C 70/52
See application file for complete search history.

(56) References Cited

U.S. PATENT DOCUMENTS

| | | | | |
|---|---|---|---|---|
| 5,503,928 A | * | 4/1996 | Cheshire | B29C 53/8066 428/357 |
| 2013/0164473 A1 | * | 6/2013 | Feeney | B29B 11/16 428/36.3 |

FOREIGN PATENT DOCUMENTS

| | | |
|---|---|---|
| EP | 2105286 A1 | 9/2009 |
| WO | 9830382 A1 | 7/1998 |

OTHER PUBLICATIONS

Computer translation of EP 2105286 to Purol, Sep. 30, 2009. (Year: 2009).*
European Search Report; Application 18193855.6-1019; dated Feb. 21, 2019.

* cited by examiner

*Primary Examiner* — Andrew T Piziali
(74) *Attorney, Agent, or Firm* — Duft & Bornsen, PC

(57) ABSTRACT

Systems and methods are provided for fabricating preforms. One embodiment is a method comprising acquiring tows of fiber reinforced material, selecting a number of tows to utilize for a bundle having an aggregate shape, assembling the tows together into the bundle, curving the assembled tows by slipping the assembled tows with respect to each other, drawing the bundle through a die to bind the bundle into a preform, enforcing a longitudinally varying cross section along the preform, and locking in a curvature of the preform.

20 Claims, 9 Drawing Sheets

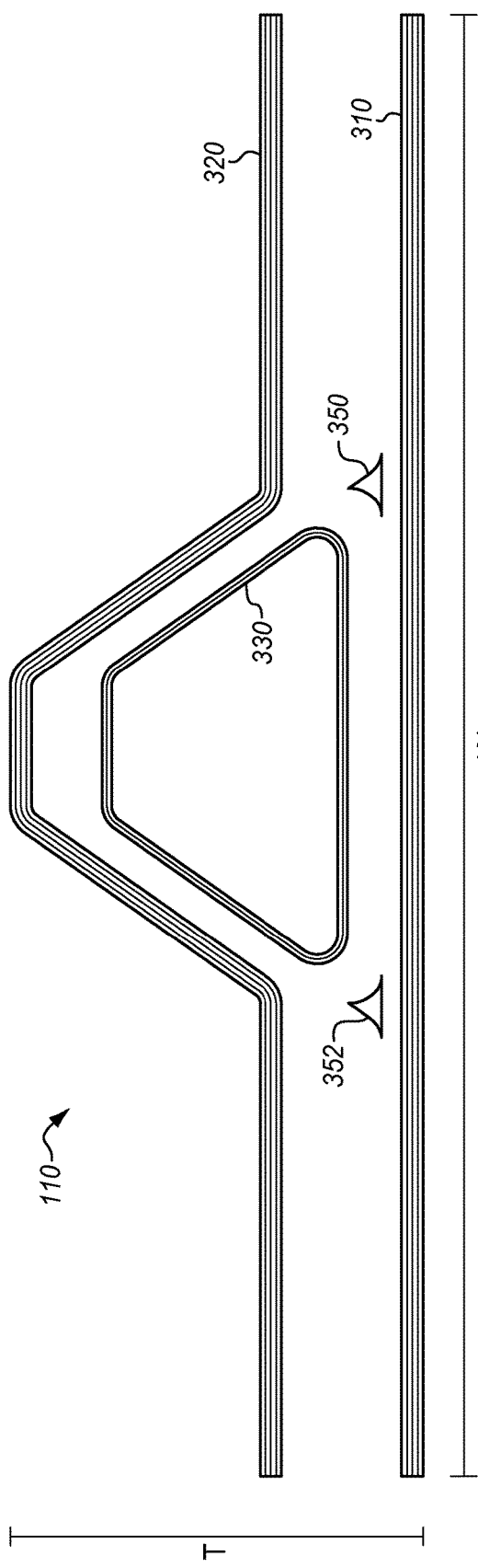
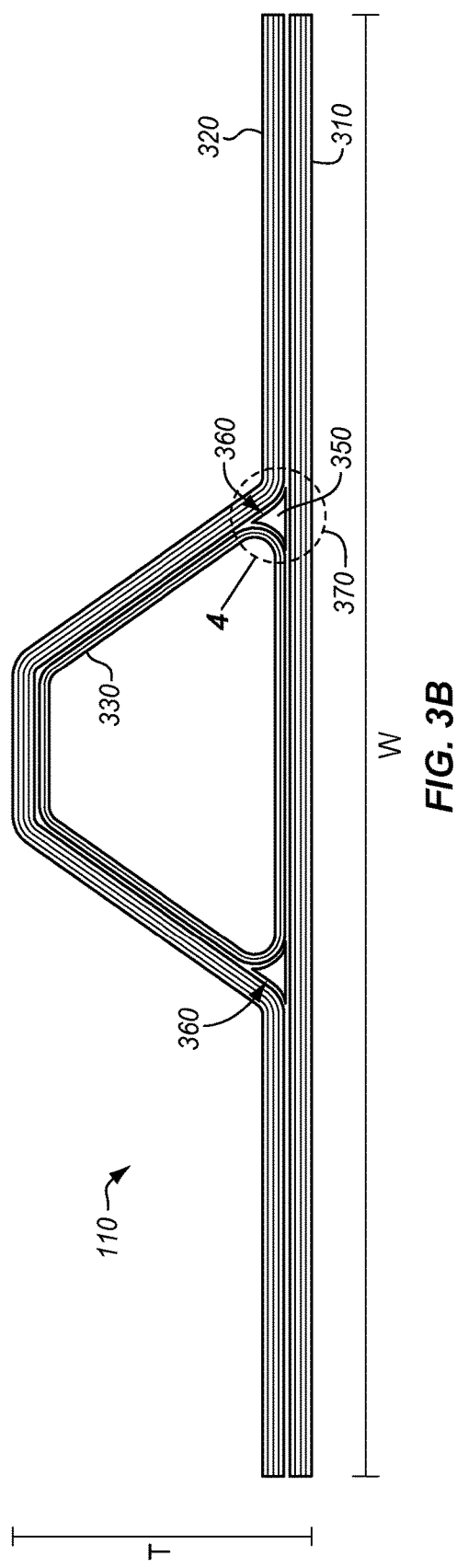

FABRICATION OF GAP FILLERS FOR COMPOSITE PARTS THAT EXHIBIT VARYING RADII OF CURVATURE

FIELD

The disclosure relates to the field of composite materials, and in particular, to gap fillers that enhance the strength of joints in composite materials.

BACKGROUND

Multi-layer laminates of constituent material (e.g., Carbon Fiber Reinforced Polymer (CFRP)) may be formed into any of a variety of shapes before they are hardened into an integral composite part. For example, dies and/or other forming tools may be utilized to alter the shape of a sheet of laminate before the laminate is hardened into a composite part.

Support structures may be fabricated from flat laminates formed into shapes with cross sections that include a bend radius. When combined with other formed laminates to create a support structure having an I, J, T, Z, C, hat, etc. cross section, the junctions between laminates may have a longitudinal gap where multiple radii are combined. A gap filler (colloquially referred to as a "noodle") is therefore desirable to occupy the gaps.

Gap fillers for composite parts can be made from "prepreg" fiber or a dry laminate for resin infusion, or even tacked together dry laminates for resin infusion. In any case, the formation of gap fillers for complex contour composite parts remains challenging, because the joints may exhibit radii of curvature that change along their length to conform to the inner mold line (IML) of the structure being supported. Current gap fillers have constant longitudinal cross section sizes, and are formed to conform to the longitudinal curvature of gaps in composite parts.

Therefore, it would be desirable to have a method and apparatus that take into account at least some of the issues discussed above, as well as other possible issues.

SUMMARY

Embodiments described herein provide for techniques and systems that are capable of automatically fabricating preforms (e.g., gap fillers) that exhibit varying curvature along their length. This results in customized gap fillers for composite parts of various shapes and sizes, which in turn enhances strength. Specifically, embodiments described herein may fabricate curved preforms by inducing slip planes between tows of fiber reinforced material within the preforms. These slip planes may be adjusted during a continuous fabrication process, and may even allow for curvature to be induced along multiple axes.

One embodiment is a method comprising acquiring tows of fiber reinforced material, selecting a number of tows to utilize for a bundle having an aggregate shape, assembling the tows together into the bundle, curving the assembled tows by slipping the assembled tows with respect to each other, drawing the bundle through a die to bind the bundle into a preform, enforcing a longitudinally varying cross section along the preform, and locking in a curvature of the preform.

A further embodiment is an apparatus comprising: tension drives that induce slip planes between individual tows, prior to the tows being aggregated into a bundle, by applying different amounts of tension to each of the tows. The apparatus also includes a controller that selects the amounts of tension applied by the tension drives, and a drive system that draws the bundle through a die, thereby binding the bundle into a preform.

A further embodiment is a manufacture. The manufacture includesa preform for an aircraft. The preform includes multiple tows of fiber reinforced material that each have been shaped into a distinct cross-sectional shape that varies longitudinally. The tows are curved by slipping with respect to each other.

A further embodiment is a manufacture. The manufacture includes a preform for an aircraft. The preform includes multiple tows of fiber reinforced material that each have been shaped into a distinct cross-sectional shape. Each tow is tensioned by a different amount than other tows in the preform, resulting in slip planes between the tows.

A further embodiment is a system that includes a guide that assembles tows of fiber reinforced material together into a bundle having an aggregate shape and tension drives that induce slip planes between the tows of the bundle by applying different amounts of tension to each of the tows. The system also includes heaters that heat the bundle to a tacking temperature at which the tows bind together, a drive system that draws the bundle through a die while the bundle is heated, thereby binding the bundle into a preform, and a cooler that reduces a temperature of the preform, thereby locking in a curvature defined by the different amounts of tension.

A further embodiment is a system that includes a controller configured to select a number of tows of fiber reinforced material for assembling into a bundle having an aggregate shape, a guide configured to assemble the number of tows of fiber reinforced material together into the bundle, and tension drives that are configured to curve the assembled tows by slipping the assembled tows with respect to each other. The system also includes heaters that are configured to heat the bundle to a tacking temperature at which the tows bind together, a drive system that draws the bundle through a die while the bundle is heated, thereby binding the bundle into a preform, and a cooler that is configured to reduce a temperature of the preform, thereby locking in a curvature defined by the slip planes.

A further embodiment is a non-transitory computer readable medium embodying programmed instructions which, when executed by a processor, are operable for performing a method. The method includes directing a drive system to acquire tows of fiber reinforced material, directing the drive system to draw the tows through a guide that assembles the tows together into a bundle having an aggregate shape, and directing tension drives to curve the assembled tows by slipping the assembled tows with respect to each other. The method also includes directing the drive system to draw the bundle through a die to bind the bundle into a preform, enforcing a longitudinally varying cross section along the preform, and locking in a curvature at the preform.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 3A-3B illustrate further views of the hat section of FIG. 2 in an illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
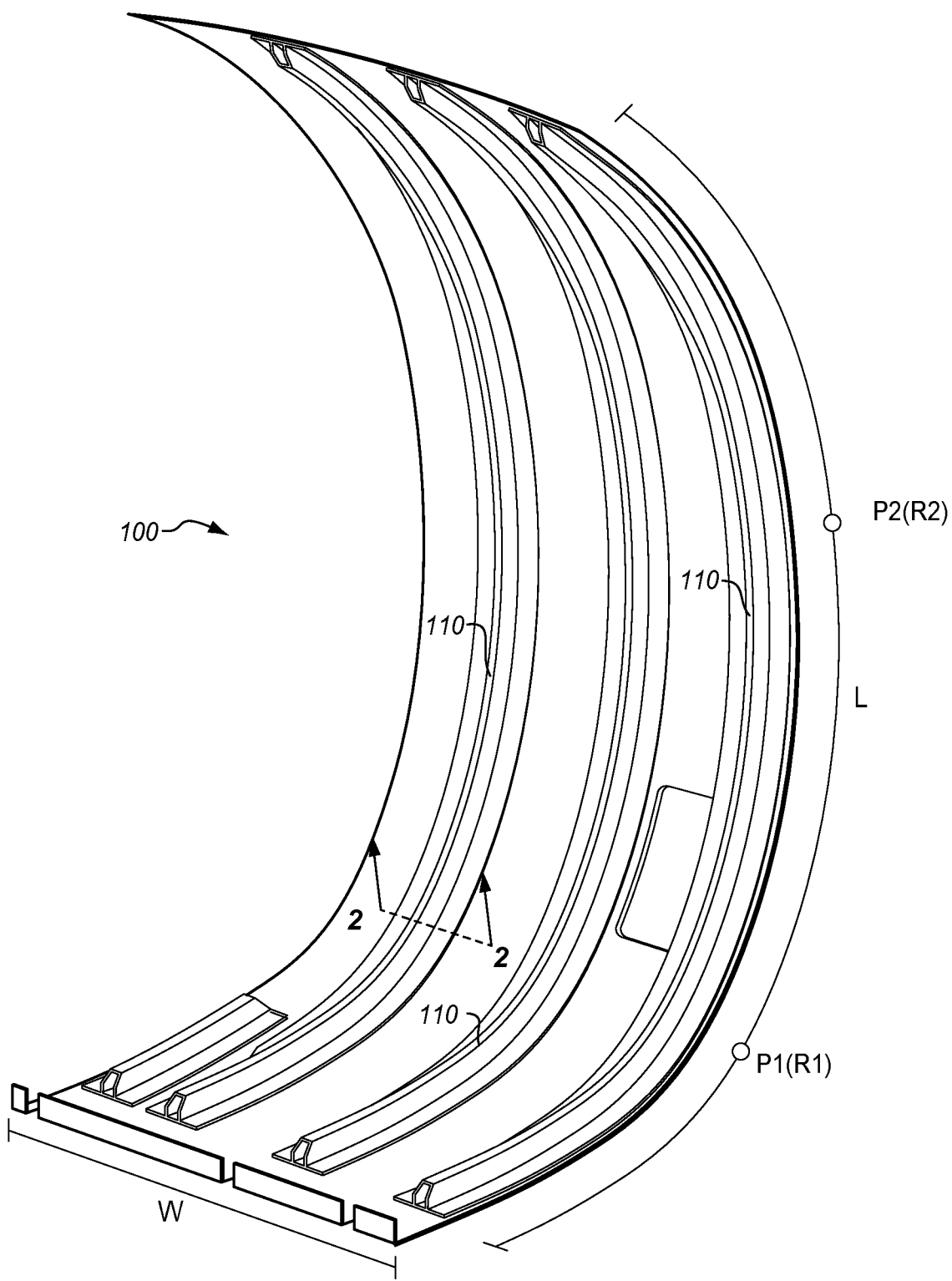
FIG. 1 illustrates a panel in an illustrative embodiment.

FIGS. 1-3B illustrate an environment in which a gap filler may be utilized to enhance the strength of a joint. Specifically, FIG. 1 illustrates panel 100 in an illustrative embodiment. Panel 100 is one of various components such as wings, stabilizers, etc. which may be structurally reinforced with a hat section or stringer. In this embodiment, panel 100 is reinforced by multiple hat sections 110 that are distributed along a width (W). Each hat section 110 extends along a length (L) of panel 100. As shown in FIG. 1, the radius of curvature of each hat section may vary along the length of panel 100. Thus, at point P1 along the length of panel 100, there is a first radius of curvature R1, and at point P2 there is a second radius of curvature R2 which is larger than R1.

Figure 2:
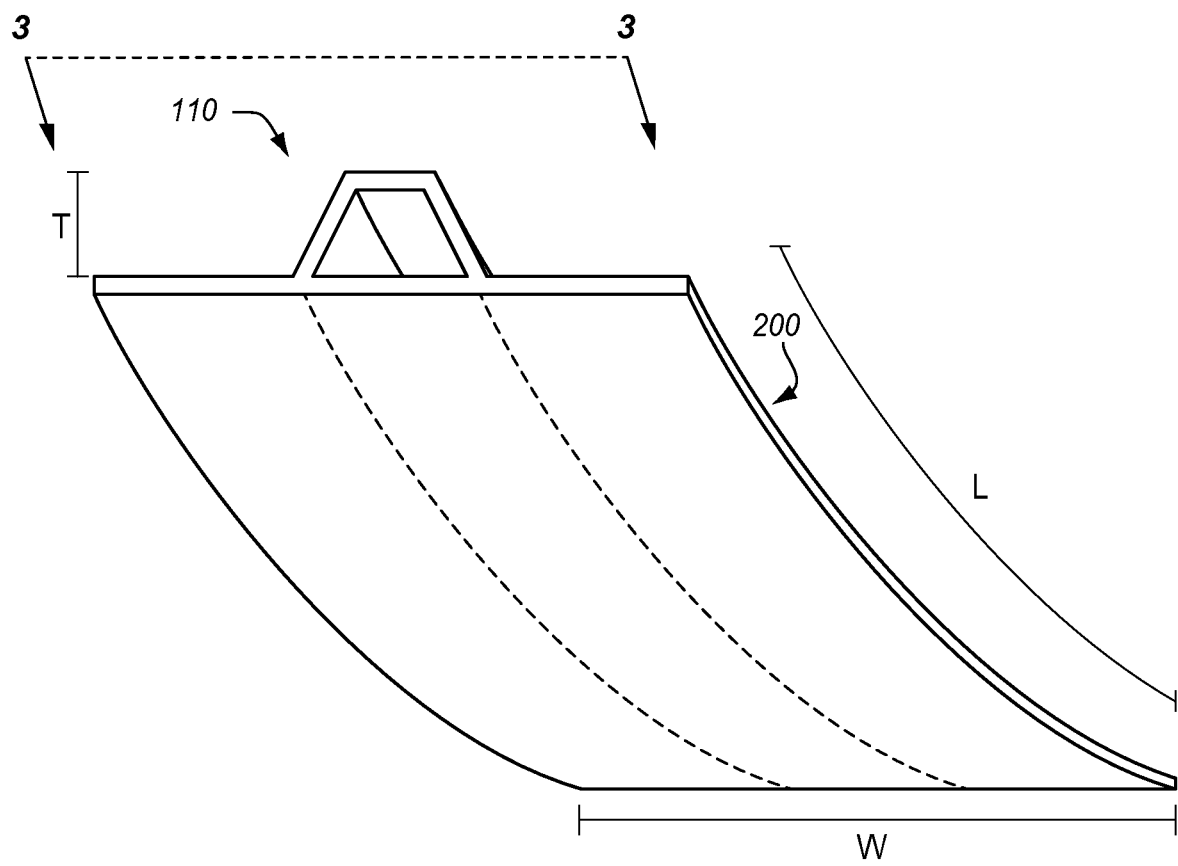
FIG. 2 illustrates a hat section of a panel in an illustrative embodiment.

FIG. 2 illustrates a hat section 200 of a panel in an illustrative embodiment. Specifically, FIG. 2 is a section cut diagram that corresponds with view arrows 2 of FIG. 1. Hat section 200 extends along a width (W), length (L), and thickness (T). Cross-sectional variation may occur along the length of hat section 200, and/or within preforms that fill gaps within hat section 200. Techniques discussed herein allow for preforms (e.g., preform 350 and preform 352 of FIG. 3) to be formed from tows that are longitudinally shaped/trimmed into varying cross-sectional shapes. In this manner, the preforms will have the same number of tows/pieces from end to end even though the cross section may vary from one location to the next along the length of the preform. This may be achieved by trimming the perimeter of the preform, and/or adjusting the shape of a die that shapes the preform. Specific details of hat section 200 are provided with regard to FIGS. 3A-3B.

Delving deeper into the geometry of hat section 200, FIGS. 3A-3B provide end views of hat section 200 corresponding with view arrows 3 of FIG. 2. FIG. 3A is an exploded end view, while FIG. 3B is a standard end view. In this embodiment, hat section 200 comprises a portion of skin 310 for panel 100, and a multi-layer overlap laminate 320 that is laid-up over skin 310 to form a "hat." A wrap 330 is placed between overlap laminate 320 and skin 310. Preform 350 and preform 352 are inserted into the joint formed by the intersection of wrap 330, overlap laminate 320, and skin 310.

Laminates that operate as preform gap fillers may comprise layers or pieces of chopped fiber, fiberglass, adhesive films, or carbon fiber. Carbon fiber that has been impregnated with a curable resin or a thermoplastic resin, is referred to as "prepreg" laminate. Other types of carbon fiber include "dry fiber" which has not been impregnated with resin but may include a tackifier or binder. After laminates have been arranged and hardened, they may form an integrated composite part.

In this embodiment, each laminate comprises one or more layers of constituent material, such as carbon fiber in "dry fiber" form (i.e., not impregnated with resin) that may be stabilized by a binding agent (e.g., a tackifier, thermoplastic veil, etc.). After being laid-up and conformed to a desired shape (e.g., via consolidation of a preform), skin 310, overlap laminate 320, wrap 330, preform 350, and preform 352 are co-cured or otherwise hardened (e.g., via the application of heat in a vacuum) in order to form an integral composite part (e.g., a cured carbon fiber stringer exhibiting desired strength).

As shown in FIG. 3B, overlap laminate 320 and skin 310 unite at joint 360. Without preform 350, joint 360 would exhibit a tight radius of curvature. Hence, preform 350 is desired to form joint 360 without voids, and preform 350 is placed within volume 370 at joint 360. Preform 350 may also be referred to as a "noodle" or "spacer." Preform 350 fills voids out at joint 360, thereby increasing the strength of joint 360 and facilitating bonding between skin 310 and overlap laminate 320.

Fibers (not shown) within preform 350 are oriented such that they extend along the length of preform 350 as preform 350 curves. It should be understood that preform 350 may be particularly long (e.g., on the order of tens of meters) and particularly narrow (e.g., varying in width but averaging a few centimeters), and may result from a continuous manufacturing process. In embodiments wherein long continuous fibers are utilized to form preform 350 and preform 352, preform 350 and preform 352 may be spliced together in order to increase length.

The width and thickness of preform 350 may vary along the length of preform 350, and may vary depending on the type of gap filler being created. Individual fibers (e.g., carbon fibers) within each tow at preform 350 may be integrated with (or within) a binder. The binder may comprise a thermoplastic veil, thermoset resin, or even a combination thereof. Meanwhile, the fibers may comprise unidirectional fibers extending along the length of preform 350.

Figure 4:
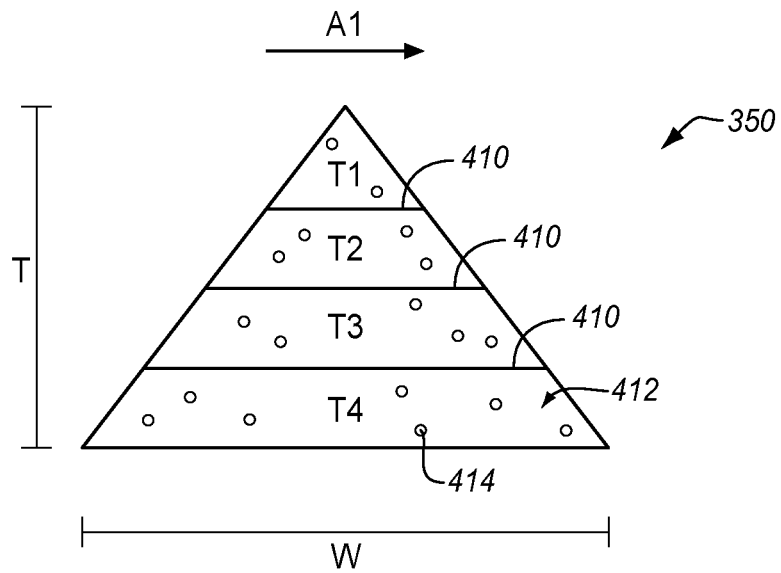
FIGS. 4-5 illustrate cross sections of a gap filler in an illustrative embodiment.
Figure 5:
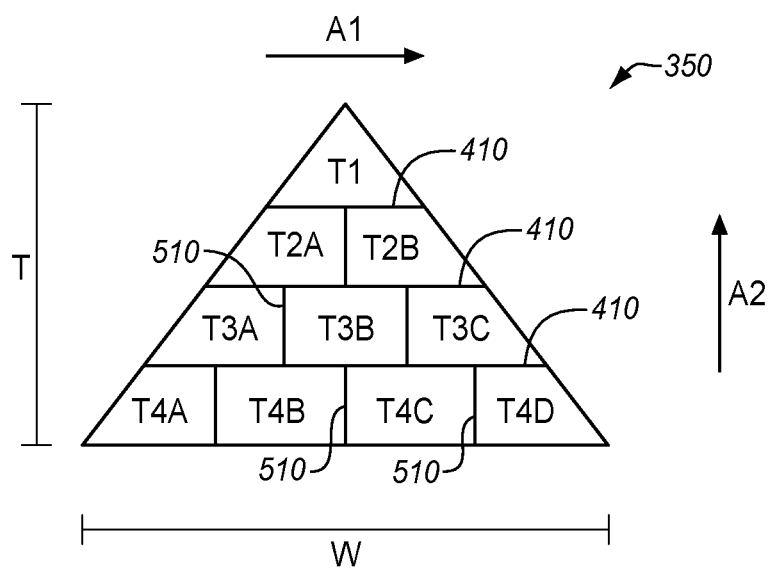

FIGS. 4-5 illustrate cross sections of a preform 350 in an illustrative embodiment. FIGS. 4-5 specifically correspond with view arrows 4 of FIG. 3B. For the embodiment illustrated in FIG. 4, preform 350 is subdivided into four tows (T1, T2, T3, and T4) along its thickness. Slip planes 410 between the tows are also illustrated, as are fibers 414 and material 412 (e.g., a thermoplastic veil, binder, resin, etc.). The arrangement of slip planes in FIG. 4 may be utilized to enforce curvature/curling about one axis (e.g., A1). In contrast, the embodiment illustrated in FIG. 5 is subdivided into many tows (T1, T2A, T2B, T3A, T3B, T3C, T4A, T4B, T4C, T4D) along both its thickness and its width. This results in slip planes 410 which are oriented laterally, and slip planes 510 which are oriented vertically. The configuration depicted in FIG. 5 enables the enforcement of curvature/curling about multiple axes (e.g., A1 and A2) as preform 350 continues along its length. In further embodiments, preform 350 may be subdivided into any suitable number of tows. The shape of tows may also vary within a preform 350. For example, in FIG. 4 tow T1 is triangular while tows T2-T4 are trapezoidal.

Figure 6:
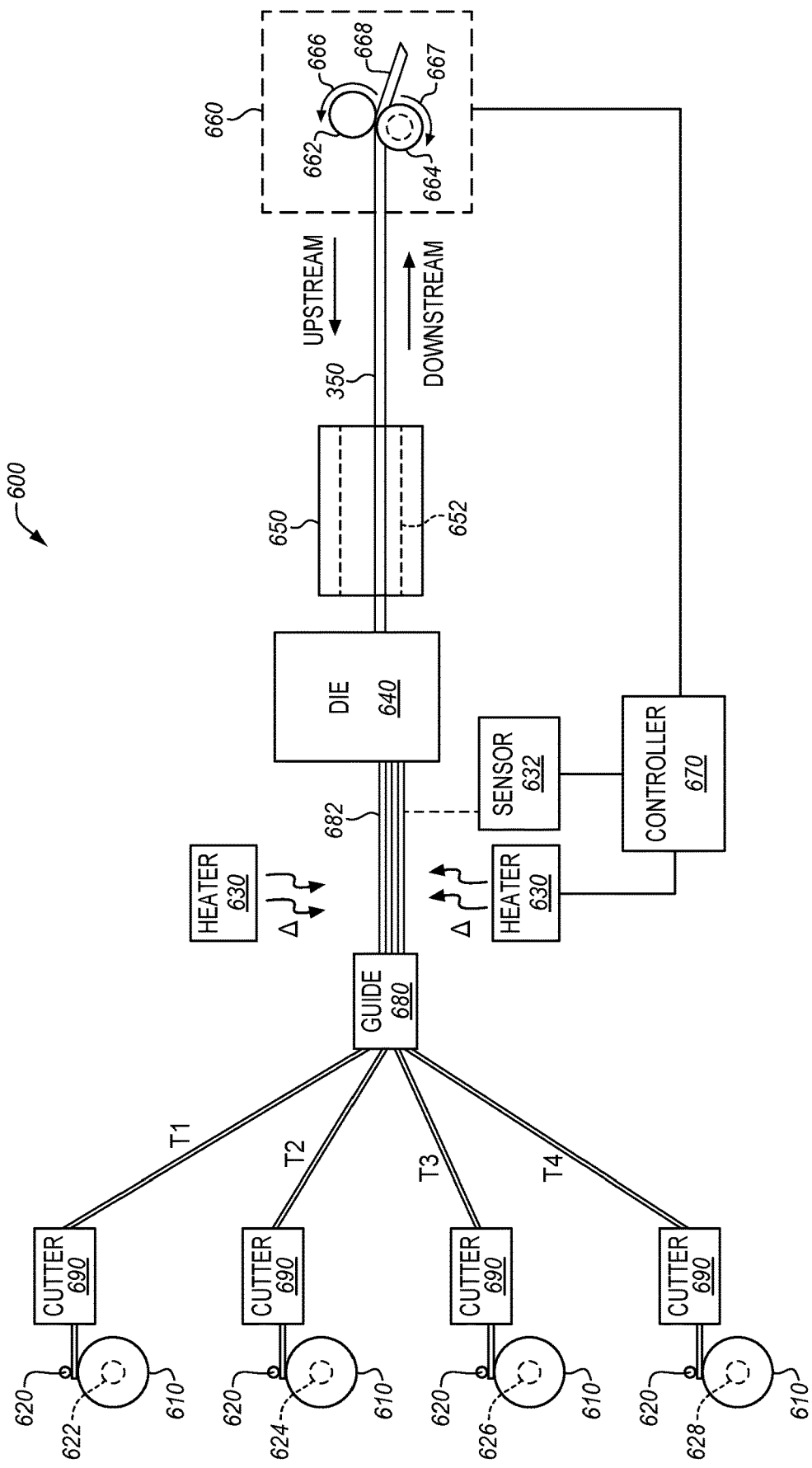
FIG. 6 is a diagram illustrating a fabrication system for curved gap fillers in an illustrative embodiment.

FIG. 6 is a diagram illustrating a fabrication system 600 for curved gap fillers in an illustrative embodiment. In particular, fabrication system 600 may be utilized to enforce desired radii of curvature (and even changing radii of curvature) onto gap fillers in order to ensure that the gap fillers do not overfill or leave voids in joints of structural components such as hat sections of panels, stringers, etc.

In this embodiment, fabrication system 600 includes rolls 610 of fiber reinforced material. Each roll provides a different tow (e.g., T1, T2, T3, T4) of the fiber reinforced material. Furthermore, each roll 610 includes a tension drive. Tension drive 622 applies tension to tow T1, tension drive 624 applies tension to tow T2, tension drive 626 applies tension to tow T3, and tension drive 628 applies tension to tow T4. The amounts of tension may range, for example, between ten and one hundred Newtons. A different amount of tension may be applied to each tow, resulting in slip planes between tows when the tows are combined and pulled through die 640. Tensions drives 622-628 may comprise tension motors, a combination of springs and/or gears, etc.

As tows exit from rolls 610 via rollers 620, the tows are each shaped by a cutter 690 (e.g., a blade or combination of blades) to a cross-sectional shape. The shape for a tow may be flat (e.g., substantially planar, or having a smooth lower or upper surface) in order to ensure that a large interfacial area exists between the tow and other tows.

In further embodiments, other shaping devices may be utilized. The specific shape may vary depending on the final cross-sectional shape desired for the gap filler. The tows continue through guide 680, which assembles the tows into bundle 682 having an aggregate cross-sectional shape roughly corresponding with the desired shape for the preform 350. For example, the aggregate shape for bundle 682 may be a shape that is not circular (e.g., a shape that is roughly triangular, or square). Bundle 682 is heated by heaters 630 to a tacking temperature or sticking point temperature. At the sticking point temperature, the binding properties of a material within each tow (e.g., a tackifier, binder, veil, etc.) activate, but curing does not yet occur. Such a temperature may comprise 80-160° Celsius (C) for thermoset resins, or 140-240° C. for thermoplastic veils. The heating ensures that the bundle 682 is capable of being reshaped by die 640 without fracturing or breaking. Heaters 630 may comprise any suitable heating components, such as radiant heaters that utilize an infrared radiant heating element.

Bundle 682 is further drawn through die 640 while heated (e.g., resulting in tens or hundreds of pounds of pressure that compresses and debulks the bundle 682 into preform 350). Die 640 therefore debulks the bundle 682 (e.g., by ten to twenty percent by volume) and shapes/binds bundle 682 in order to create preform 350.

Upon exiting die 640, preform 350 enters cooler 650, which includes cooling chamber 652. Within cooling chamber 652, a cooling fluid (e.g., a jet of air below the sticking point temperature) reduces the temperature of preform 350 to solidify preform 350. In some embodiments, liquids and chemical refrigerants are used by cooler 650 to cool preform 350 by conduction through an evaporator or conventional refrigeration circuit. In embodiments where tows T1-T4 are tows of dry fiber, preform 350 may be fabricated "dry" such that it awaits resin impregnation/infusion and curing. In further embodiments, tows T1-T4 comprise fiber that is pre-impregnated with curable resin (prepreg), adhesive films, fiberglass, etc.

Drive system 660 pulls preform 350 through die 640 in a continuous process. The amount of tension applied by drive system 660 may be based on the sum of amounts of tension applied by tension drives 622-628, as well as a speed at which preform 350 should be drawn through die 640. In this embodiment, drive system 660 comprises pinch rollers 662 and 664, which rotate along directions 666 and 667, forming a nip 668 through which preform 350 is pulled. Nip 668 provides gripping and pulling action to preform 350. Thus, nip 668 may be dimensioned to be smaller than the cross section of preform 350 in order to provide sufficient clamping force. The material geometry of preform 350 has already been set by the heating, forming and cooling process.

The rollers apply a pulling force (e.g., tens of pounds of force) in order to pull preform 350 out of die 640. This force also applies tension to preform 350, ensuring that preform 350 remains taught. In further embodiments, drive system 660 may comprise a tension puller attached to preform 350, such as a motor that pulls a cord which is clamped to a tip of preform 350.

Carefully calibrated tension control, performed on a tow-by-tow basis prior to entry into die 640, enables the creation of slip planes in a controllable manner. Thus, in some embodiments it is desirable for roller 662, roller 664, and/or rolls 610 to include a clutch and/or brake (not shown) to facilitate tension control. These systems may be calibrated and/or directed by controller 670.

Controller 670 manages the various operations of the components of fabrication system 600 described above. For example, controller 670 may adjust an amount of pulling force applied by drive system 660, an amount of cooling fluid applied via cooler 650, an amount of heat applied by heaters 630, etc., in order to ensure that a steady-state process is reached wherein the unwinding, heating, feeding, cooling and drawing are performed simultaneously. Sensor 632 provides temperature feedback to controller 670 indicating a temperature of bundle 682 prior to entering the die 640. Controller 670 may engage in active feedback control by regulating the pulling force of drive system 660 based on input from sensor 632. For example, if the temperature is too high, controller 670 may increase the speed at which preform 350 is drawn, and if the temperature is too low, controller 670 may decrease the speed at which preform 350 is drawn. Controller 670 may be implemented, for example, as custom circuitry, as a hardware processor executing programmed instructions, or some combination thereof.

In a further embodiment, pinch roller 662 and/or pinch roller 664 include internal sensors (e.g., torque sensors that sense torque at a roller, load sensors, etc.) that measure resistance of preform 350 to being pulled. This measure is indicative of a level of tension at preform 350. Hence, controller 670 may utilize input from the internal sensors at pinch roller 662 and/or pinch roller 664 to ensure that tension at preform 350 is kept between a desired minimum and maximum level of tension.

Because different amounts of tension are applied to different tows, slip planes are generated between the tows. This results in incrementally different lengths of each tow passing through die 640, which results in different/distinct tensions at preform 350. After preform 350 has been cooled below tacking temperature (or sticking point temperature) and cut/shaped, the tensions cause internal stresses that enforce a curvature along a length of preform 350. For example, these tensions may be particularly suitable when generating radii of curvature between one hundred and fifty, and two hundred inches.

Lengths of preform 350 may be cut and stored for later application to a laminate that will be cured into a composite part. Throughout the process, controller 670 may regulate unwinding, tensioning, heating, and drawing of tows by preventing tension at the tows from exceeding a target value or going outside of a target range. Controller 670 may further adjust the amounts of tension applied by tension drives 622-628 during the continuous fabrication. This adjusts the slip planes, which alters the radius of curvature of preform 350 at different positions along the length of preform 350. Controller 670 may even adjust the amounts of tension to alter the direction of curvature if desired. For example, the highest tension is applied to tows at the inside of the curve where the curve is tightest and the radius of curvature is smallest, while the lowest tension is applied to tows at the outside of the curve where the curve is least tight and the radius of curvature is largest.

Illustrative details of the operation of fabrication system 600 will be discussed with regard to FIG. 7. Assume, for this embodiment, that an operator has loaded fiber reinforced material onto rolls 610, and that controller 670 has selected a number of tows to utilize for preform 350, based on the height desired for preform 350. Controller 670 may even drop tows at particular longitudinal locations to dynamically adjust cross-sectional shape. The operator has fed tips of tows from rolls 610 through die 640 and into rollers 662 and 664. Thus, a leader section of preform 350 may exist which does not yet have a desired cross-section or curvature. This leader section may be pulled through fabrication system 600 and then removed. In short, the leader section is used to prime the process of gap filler creation, and will not be a part of preform 350 as laid-up for a composite part.

Figure 7:
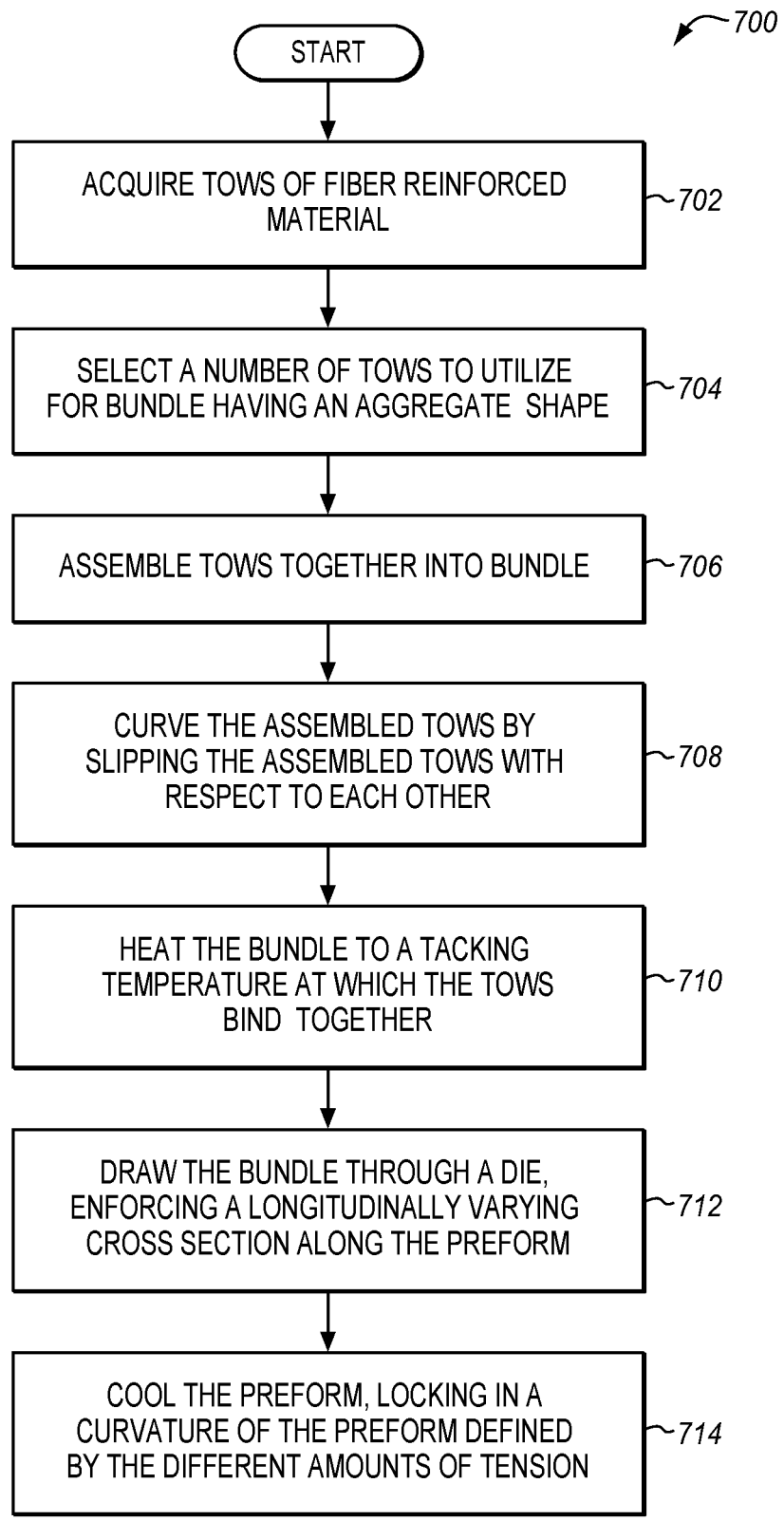
FIG. 7 is a flowchart illustrating a method for operating a fabrication system for curved gap fillers in an illustrative embodiment.

FIG. 7 is a flowchart illustrating a method 700 for operating a fabrication system 600 for curved gap fillers in an illustrative embodiment. The steps of method 700 are described with reference to fabrication system 600 of FIG. 1, but those skilled in the art will appreciate that method 700 may be performed in other systems. The steps of the flowcharts described herein are not all inclusive and may include other steps not shown. The steps described herein may also be performed in an alternative order.

Controller 670 directs operation of drive system 660 to initiate rotation, which causes preform 350 (and therefore tows T1-T4) to advance, being pulled from upstream to downstream. This results in acquiring tows T1-T4 of fiber reinforced material from rolls 610 (step 702). During this process, controller 670 may actively use input from one or more internal sensors at drive system 660 to regulate a speed of drive system 660. Controller 670 may also select a number of tows to utilize for a bundle 682 having an aggregate shape (step 704).

After unwinding from rolls 610, tows T1-T4 may be longitudinally shaped/trimmed by cutters 690 (e.g., blades or combinations of blades) into varying cross-sectional shapes. In this manner, the resulting preform may have the same number of tows/pieces from end to end even though the cross section may vary from one location to the next along the length of the preform. Cross-sectional variation along the length of a resulting bundle 682 may be achieved by trimming the perimeter of the preform, and adjusting the shape of die 640. In further embodiments, any suitable components may be utilized to shape tows T1-T4. The tows proceed to guide 680, where they are assembled into bundle 682, which has an aggregate cross-sectional shape roughly corresponding with the cross-sectional shape of preform 350 (step 706). Tension drives 622 curve the assembled tows by slipping the assembled tows with respect to each other (step 708). Thus, while the tows are being drawn, slip planes are induced between tows T1-T4 by applying different amounts of tension to each of tows T1-T4 via tension drives 622-628.

The tows continue to be pulled, and pass by heaters 630. Heaters 630 apply heat to bundle 682, increasing a temperature of bundle 682 to a tacking temperature (or sticking point temperature) at which the tows bind together (step 710). The tacking temperature may be for a constituent material within the tows that binds the tows of fiber together (e.g., a binder, thermoplastic veil, etc.). This enhances the ability of the individual tows to bind/cohere together. Bundle 682 is drawn through die 640 while heated, which compresses (i.e., debulks and shapes) bundle 682 into preform 350 (step 712). This enforces a longitudinal cross section along the preform, which may vary. Upon exiting die 640, preform 350 is cooled by cooler 650, thereby locking in a curvature of the preform defined by the different amounts of tension applied to tows T1-T4 (step 714). When preform 350 is cut/shaped, preform 350 exhibits the radius of curvature locked in by the distinct tensions. Thus, preform 350 curves along its length.

In further embodiments, controller 670 may determine (e.g., based on a numerical control program) that a preform 350 shall exhibit different radii of curvature at different locations along its length. To this end, controller 670 may direct the tension drives 622-628 to alter the amount of applied tension, in order to change the radius of curvature at different locations along the length of preform 350.

Method 700 provides a substantial benefit over prior techniques for forming gap fillers, because method 700 allows for gap fillers which have varying radii of curvature along their length to be formed via a continuous process. This technique prevents wrinkle formation and kinking when a gap filler is applied to a laminate awaiting curing. Furthermore, this technique allows for rapid and economical automated fabrication of gap fillers.

While method 700 describes selecting a number of tows based on a desired height for preform 350, in further embodiments the number of tows may be selected based on height, width, areal weight of the fiber reinforced material, etc.

Figure 8:
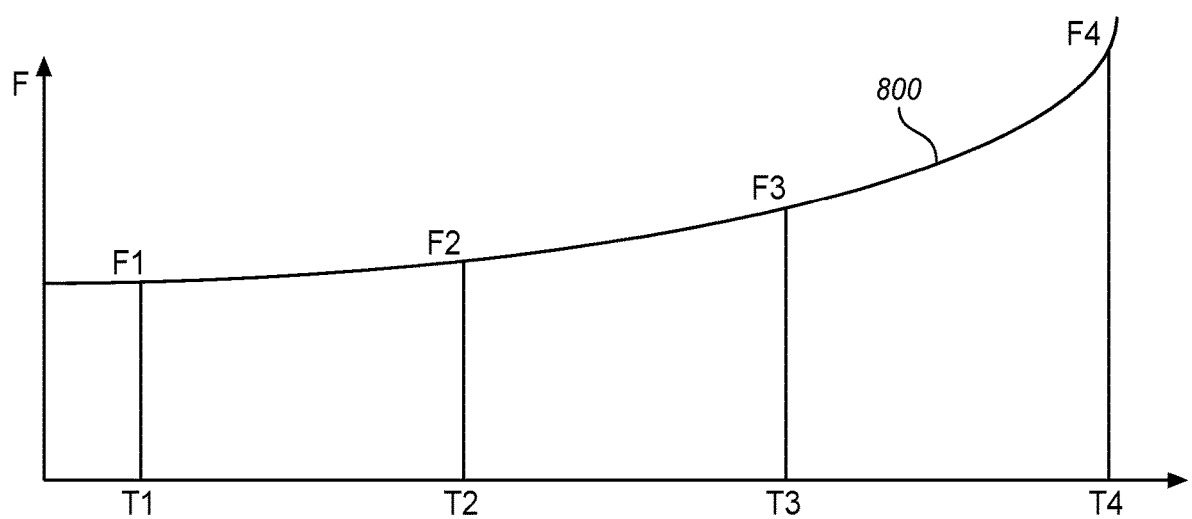
FIG. 8 is a force diagram illustrating a force function used to apply a curvature to a gap filler in an illustrative embodiment.

FIG. 8 is a force diagram illustrating a force function 800 used to apply a desired curvature to a preform in an illustrative embodiment. Controller 670 may store and load a variety of force functions (e.g., mathematically defined functions indicating amounts of force to apply to individual tows) in order to enforce a variety of radii of curvature onto a preform 350. For example, controller 670 may detect a lengthwise position along preform 350, and identify a radius of curvature to enforce at the position. Controller 670 may then load a force function for the radius of curvature, and direct tension drives 622-628 based on the force function.

In this embodiment, force function 800 applies force F1 to tow T1, force F2 to tow T2, force F3 to tow T3, and force F4 to tow T4. When these forces are applied to resist the drawing forces of drive system 660, it causes slightly different amounts of each tow to be drawn through die 640 (e.g., a difference in length of less than ten percent, or one percent). In this example, because tow T4 experiences the highest resisting force, the least amount of tow T4 is drawn through die 640. In contrast, because tow T1 experiences the lowest resisting force, the greatest amount of tow T1 is drawn through die 640. This results in distinct tensions at a preform 350 that cause the preform 350 to curl. The curling results in tow T1 forming an outer portion of curvature and tow T4 forming an inner portion of curvature.

EXAMPLES

In the following examples, additional processes, systems, and methods are described in the context of a fabrication system that enforces curvature within a gap filler via the use of slip planes.

Figure 9:
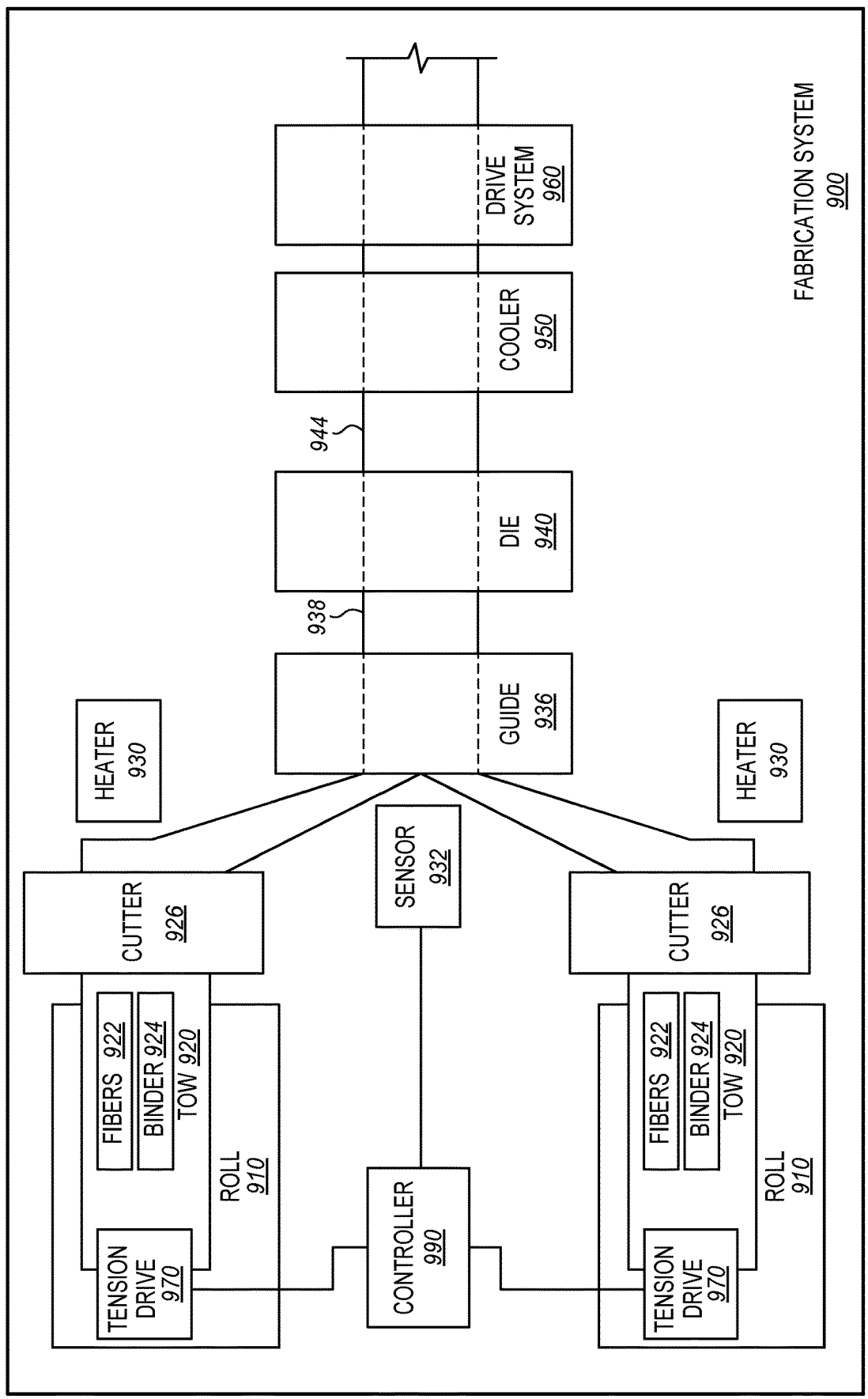
FIG. 9 is a block diagram of a fabrication system in an illustrative embodiment.

FIG. 9 is a block diagram of a fabrication system 900 in an illustrative embodiment. Fabrication system 900 applies different amounts of tension to tows 920 stored on rolls 910, in order to enforce varying radii of curvature onto a resulting gap filler 844. In this embodiment, each tow 920 includes unidirectional fibers 922 which are held together by a binder 924. Tension drives 970, managed by controller 990, apply variable amounts of tension to each tow 920. Cutters 926 shape each tow 920 into a desired cross-sectional shape, including for example cross-sectional variations lengthwise along the preform. The tows 920 enter guide 836, which assembles tows 920 into bundle 938. Bundle 938 enters die 940, which may have a wider entrance than the final die shape. This shape ensures that bundle 938 does not bunch up, which enforces a cross-sectional shape onto bundle 938 to form preform 944. Preform 944 is cooled by convective heat transfer within cooler 950, and drawn through die 940 by drive system 960. A sensor 932 may be monitored by controller 990 to determine a temperature of tows 920 and/or amount of linear distance drawn by drive system 960. Based on this information, controller 990 may adjust a speed of drive system 960, an amount of heat applied by heaters 930, and/or amounts of tension applied by tension drives 970.

Figure 10:
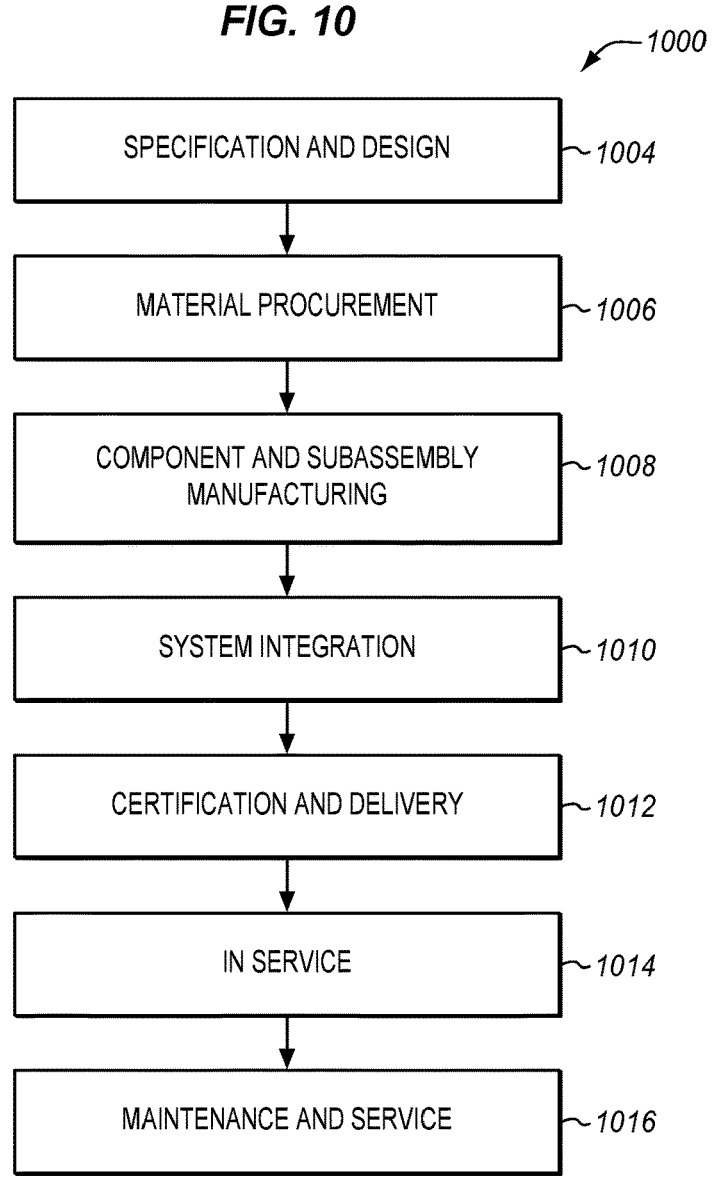
FIG. 10 is a flow diagram of aircraft production and service methodology in an illustrative embodiment.
Figure 11:
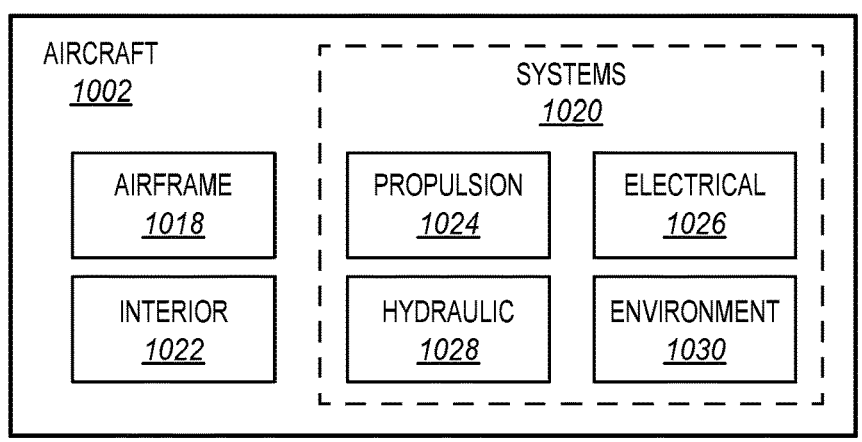
FIG. 11 is a block diagram of an aircraft in an illustrative embodiment.

Referring more particularly to the drawings, embodiments of the disclosure may be described in the context of an aircraft manufacturing and service method 1000 as shown in FIG. 10 and an aircraft 1002 as shown in FIG. 11. During pre-production, illustrative method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016 (which may also include modification, reconfiguration, refurbishment, and so on). Apparatus and methods embodied herein may be employed during any one or more suitable stages of the production and service method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion 1024, electrical 1026, hydraulic 1028, environmental 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by illustrative method 1000 may include an airframe 1018 with a plurality of systems 1020 and an interior 1022. Examples of high-level systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1000. For example, components or subassemblies corresponding to production stage 1008 may be fabricated or manufactured in a manner similar to components or subassemblies produced while the aircraft 1002 is in service. Also, one or more apparatus embodiments, method embodiments, or a combination thereof may be utilized during the production stages 1008 and 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation, to maintenance and service 1016. For example, the techniques and systems described herein may be used for steps 1006, 1008, 1010, 1014, and/or 1016, and/or may be used for airframe 1018 and/or interior 1022. These techniques and systems may even be utilized for systems 1020, including for example propulsion 1024, electrical 1026, hydraulic 1028, and/or environmental 1030.

In one embodiment, preform 350 is utilized within a hat section of a panel at airframe 1418, and is manufactured during component and subassembly manufacturing 1408. The panel may then be assembled into an aircraft in system integration 1410, and then be utilized in service 1414 until wear renders the panel unusable. Then, in maintenance and service 1416, the panel may be discarded and replaced with a newly manufactured fan cowl panel, or may be repaired. New preforms may be utilized throughout component and subassembly manufacturing 1408 in order to facilitate fabrication of the new panel.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
acquiring tows of dry fiber reinforced material that are stabilized by a binding agent;
selecting a number of the tows to utilize for a bundle having an aggregate shape;
assembling the tows together into the bundle;
enforcing a curvature onto the bundle by slipping tows within the bundle with respect to each other;
heating the bundle to a sticking point temperature of the binding agent;
drawing the bundle through a die while the binding agent is heated to the sticking point temperature, to bind the bundle into a preform, enforcing a longitudinally varying cross section along the preform;
locking in a curvature of the preform by cooling the binding agent below the sticking point temperature while the tows remain dry fiber reinforced material;
applying the preform to a laminate while the curvature is locked in; and
hardening the laminate and the preform into an integral composite part.

2. The method of claim 1 wherein:
inducing slip planes between the tows of the bundle is by applying different amounts of tension to each of the tows.

3. The method of claim 2 wherein:
the curvature is defined by the different amounts of tension.

4. The method of claim 2 wherein:
the amounts of tension applied to each tow are selected based on a desired curvature for the preform.

5. The method of claim 2 further comprising:
varying tensions to the tows via tension drives that each adjustably control tension at a specific tow.

6. The method of claim 1 further comprising:
selecting a number of tows to utilize for the bundle is based upon a height for the preform at a particular longitudinal location.

7. The method of claim 1 further comprising:
heating the bundle to a tacking temperature at which the tows bind together.

8. The method of claim 1 further comprising:
controlling tension at the tows by operating clutches at rollers that dispense the tows.

9. The method of claim 1 further comprising:
impregnating the preform with resin.

10. The method of claim 1 wherein:
cooling the binding agent comprises directing air below the tacking temperature onto the preform.

11. The method of claim 1 wherein:
the tows are assembled together along multiple axes; and
slip planes are induced between the tows along the axes.

12. The method of claim 1 further comprising:
altering slip planes while continuously fabricating the preform, resulting in adjusting a radius of the curvature of the preform.

13. The method of claim 1 wherein:
assembling the tows together into a bundle results in an aggregate shape that is not circular.

14. The method of claim 1 further comprising:
performing the acquiring, assembling, inducing, and drawing continuously and concurrently.

15. The method of claim 1 further comprising:
rotating pinch rollers that pinch the preform to pull the bundle through the die.

16. The method of claim 1 further comprising:
pulling a tension puller attached to the integral preform to draw the bundle through the die.

17. The method of claim 1 further comprising:
selecting a number of tows for the preform based on an areal weight of the fiber reinforced material.

18. The method of claim 1 further comprising:
adjusting a speed of drawing the bundle through the die based on a temperature of the bundle prior to entering the die.

19. The method of claim 1 further comprising:
varying the aggregate shape by trimming the tows.

20. A non-transitory computer readable medium embodying programmed instructions which, when executed by a processor, are operable for performing a method of:
directing a drive system to acquire tows of dry fiber reinforced material that are stabilized by a binding agent;
directing the drive system to draw the tows through a guide that selects a number of tows and assembles the tows together into a bundle having an aggregate shape;
directing tension drives to curve the assembled tows by slipping the assembled tows with respect to each other;
heating the bundle to a sticking point temperature of the binding agent;
directing the drive system to draw the bundle through a die while the binding agent is heated to the sticking point temperature, to bind the bundle into a preform, enforcing a longitudinally varying cross section along the preform;
locking in a curvature of the preform by cooling the binding agent below the sticking point temperature while the tows remain dry fiber reinforced material;
applying the preform to a laminate while the curve is locked in; and
hardening the laminate and the preform into an integral composite part.

* * * * *